(12) United States Patent
Scharfenberger et al.

(10) Patent No.: US 9,659,371 B2
(45) Date of Patent: May 23, 2017

(54) SYSTEM AND METHOD FOR ONLINE PROJECTOR-CAMERA CALIBRATION FROM ONE OR MORE IMAGES

(71) Applicant: CHRISTIE DIGITAL SYSTEMS USA, INC., Cypress, CA (US)

(72) Inventors: Christian Scharfenberger, Amtzell (DE); Hicham Sekkati, Longueuil (CA); Jason Deglint, Langley (CA); Matthew Post, Brampton (CA)

(73) Assignee: CHRISTIE DIGITAL SYSTEMS USA, INC., Cypress ( * ) Notice: Subject to any disclaimer, the term of this patent is extended or adjusted under 35 U.S.C. 154(b) by 0 days.

(21) Appl. No.: 14/878,267

(22) Filed: Oct. 8, 2015

(65) Prior Publication Data

US 2017/0103509 A1 Apr. 13, 2017

(51) Int. Cl.
*H04N 17/00* (2006.01)
*H04N 17/02* (2006.01)
(Continued)

(52) U.S. Cl.
CPC .......... *G06T 7/002* (2013.01); *G06K 9/4604* (2013.01); *G06T 5/006* (2013.01); *H04N 9/3185* (2013.01); *H04N 17/002* (2013.01)

(58) Field of Classification Search
USPC ....... 348/187, 180, 159, 140, 139, 137, 136, 348/135, 309, 333.1, 333.08, 333.09, 345,
(Continued)

(56) References Cited

U.S. PATENT DOCUMENTS 5,870,136 A * 2/1999 Fuchs ................. G01S 5/16
348/169
6,793,350 B1 9/2004 Raskar et al.
(Continued)

FOREIGN PATENT DOCUMENTS

EP 2779091 A1 9/2014
KR 20080104947 A 12/2008

OTHER PUBLICATIONS

Extended European Search Report dated Feb. 16, 2017 for European Patent Application No. 16182978.3.
(Continued)

*Primary Examiner* — Brian Yenke
*Assistant Examiner* — Mustafizur Rahman
(74) *Attorney, Agent, or Firm* — Perry + Currier Inc.

(57) ABSTRACT

A system and method for online projector-camera calibration from one or more images is provided. The system comprises: a projector, a camera, and a calibration device configured to: determine a map between pixels of each of a projector image and a camera image in fewer than one hundred percent of pixels of the projector image using feature extraction; determine an initial estimate of a fundamental matrix from the map; determine an initial guess of intrinsic properties of the projector and camera using one or more closed-form solutions; iteratively determine an error-function based on the map using the fundamental matrix while adding constraints on the intrinsic properties using the one or more closed-form solutions, and the initial estimate and guess as initial input; and, when the error-function reaches an acceptance value, determine intrinsic and extrinsic properties of the projector and the camera from current values of iterative estimates.

18 Claims, 9 Drawing Sheets

(51) Int. Cl.
  *G06T 7/00* (2017.01)
  *G06T 5/00* (2006.01)
  *H04N 9/31* (2006.01)
  *G06K 9/46* (2006.01)

(58) Field of Classification Search
  USPC ..... 348/659, 716, 725, 744, 745, 39, 42, 46, 348/47, 48, 49, 50, 51; 345/87, 156, 419, 345/634, 641, 694; 352/57, 66, 67; 382/154, 162, 165, 285, 294
  See application file for complete search history.

(56) References Cited

U.S. PATENT DOCUMENTS

| | | | |
|---|---|---|---|
| 8,009,930 | B2 | 8/2011 | Li et al. |
| 8,390,677 | B1 | 3/2013 | Said |
| 2002/0050061 | A1 | 5/2002 | Komyoji et al. |
| 2002/0126891 | A1* | 9/2002 | Osberger ............ G06K 9/00711 382/165 |
| 2004/0202365 | A1* | 10/2004 | Spaulding ............ H04N 1/6077 382/162 |
| 2007/0139322 | A1* | 6/2007 | Takemoto ............ G06F 3/0321 345/87 |
| 2007/0273795 | A1 | 11/2007 | Jaynes et al. |
| 2007/0291185 | A1* | 12/2007 | Gelb .................... H04N 9/3147 348/745 |
| 2008/0075324 | A1* | 3/2008 | Sato ................... G01B 11/2504 382/106 |
| 2008/0174516 | A1 | 7/2008 | Xiao et al. |
| 2008/0231710 | A1* | 9/2008 | Asari .................. H04N 17/002 348/187 |
| 2008/0266459 | A1* | 10/2008 | Butterworth ........... H04N 9/642 348/649 |
| 2009/0153553 | A1* | 6/2009 | Kim ........................ G06T 17/20 345/419 |
| 2009/0245690 | A1* | 10/2009 | Li ........................ G06T 7/0018 382/285 |
| 2010/0045701 | A1 | 2/2010 | Scott et al. |
| 2010/0216076 | A1 | 8/2010 | Hong et al. |
| 2011/0176007 | A1 | 7/2011 | Ding et al. |
| 2012/0019670 | A1* | 1/2012 | Chang .................. H04N 9/3147 348/189 |
| 2012/0069021 | A1* | 3/2012 | Son ........................ G06T 15/40 345/426 |
| 2012/0299823 | A1* | 11/2012 | Katsumata ............ G06F 3/0386 345/156 |
| 2012/0320032 | A1* | 12/2012 | Zhu ........................ G06T 17/00 345/419 |
| 2013/0113975 | A1* | 5/2013 | Gabris ................... G03B 17/54 348/333.1 |
| 2013/0120547 | A1* | 5/2013 | Linnell .................. G06T 13/40 348/61 |
| 2013/0257880 | A1* | 10/2013 | Li ........................ G02B 6/0035 345/501 |
| 2014/0064458 | A1* | 3/2014 | Jobst ........................ A61B 6/00 378/207 |
| 2014/0139668 | A1* | 5/2014 | Short ..................... G03B 15/00 348/143 |
| 2015/0015732 | A1* | 1/2015 | Vieth ................. H04N 5/23229 348/222.1 |
| 2015/0036105 | A1* | 2/2015 | Ide ....................... H04N 9/3129 353/31 |
| 2015/0286033 | A1* | 10/2015 | Osborne ............ G02B 13/0015 348/345 |

OTHER PUBLICATIONS

Gotz, Andreas, "Extended European Search Report", European Patent Application No. 12839944.1, issued Sep. 9, 2015.

* cited by examiner

SYSTEM AND METHOD FOR ONLINE PROJECTOR-CAMERA CALIBRATION FROM ONE OR MORE IMAGES

FIELD

The present specification relates generally to projectors and specifically to a system and method for online projector-camera calibration from one or more images.

BACKGROUND

Calibration of a projector-camera stereo system consisting of at least one projector and at least one camera can be required for many computer vision/graphics applications such as 3D scan of surfaces, augmented reality display, etc. Existing methods used for this calibration perform the calibration as a separate and specific step by projecting structured-light patterns on 2D/3D objects and/or by acquiring different poses of a planar checkerboard. Either way, a delay occurs before the projection of desired content occurs in order to perform the calibration, and further viewers are exposed to projection of the structured-light patterns (such as gray code and binary patterns) and/or the planar checkerboard. Performing an "offline" calibration (e.g. prior to the projector-camera stereo system and prior to viewers interacting with the projector-camera stereo system) is not always convenient especially for real-time systems and/or for systems operating with large projector-camera baseline.

SUMMARY

In general, this disclosure is directed to a system and method for online projector-camera calibration from one or more images which is fully automated, for example to determine projector parameters using natural images. Such natural images include images that are to be projected while the projector-camera system is in use, and that do not form part of a separate calibration step. In general, it is assumed the images comprise at least a minimum number of features that are distinguishable from one another. However, the methods described herein could also be used with structured-light patterns, again assuming the structured-light patterns comprise at least a minimum number of features that are distinguishable from one another. In general, the pro-jector projects a projector image onto an environment (which could be two-dimensional and/or three-dimensional). A camera, with a field of view that at least partially overlaps a projection area of the projector, captures a camera image of the projected image. A correspondence map is produced by finding "sparse" correspondences between features in the camera image and the projector image where feature extraction techniques are used to match distinguishable features in the projector image and the camera image in fewer than one hundred percent of the pixels in areas of the projector image, and features that are indistinguishable from each other are discarded. Hence, pixels in areas of the projector image associated with indistinguishable features are not mapped, which leads to a "sparse" mapping and/or "sparse" correspondences between camera image pixels and projector image pixels in the form of the correspondence map. Estimates for calibration parameters including intrinsic, extrinsic, and/or distortion parameters are then made from the correspondence map, for example by determining an initial estimate of a fundamental matrix, and using iterative processing of an error-function. The iterative processing of the error-function is based on the correspondence map using the fundamental matrix while adding constraints on the respective intrinsic properties using the one or more closed-form solutions, and optionally correcting distortions of respective lenses of the projector and the camera. When the error-function reaches an acceptance value, respective intrinsic properties and respective extrinsic properties of the projector and the camera are determined from current values of iterative estimates.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system comprising: a calibration device; a projector; and a camera, a field of view of the camera at least partially overlapping a projection area of the projector; the calibration device configured to: control the projector to project a projector image; receive a camera image from the camera, the camera image comprising the projector image as captured by the camera; determine a correspondence map between respective pixels of each of the projector image and the camera image in fewer than one hundred percent of pixels of the projector image by: using feature extraction to match features in the projector image and the camera image in the fewer than one hundred percent of the pixels in areas of the projector image; and, discarding the features that are indistinguishable from each other such that pixels in areas of the projector image associated with indistinguishable features are not mapped; determine an initial estimate of a fundamental matrix from the correspondence map, the fundamental matrix mapping each projector pixel to a line in the camera image; determine an initial guess of intrinsic properties of the projector and the camera by using one or more closed-form solutions; iteratively determine an error-function based on the correspondence map using the fundamental matrix while adding constraints on the respective intrinsic properties using the one or more closed-form solutions, and correcting distortions of respective lenses of the projector and the camera, using the initial estimate of the fundamental matrix and the initial guess of intrinsic properties of the projector and the camera as initial input; and, when the error-function reaches an acceptance value, determine respective intrinsic properties and respective extrinsic properties of the projector and the camera from current values of iterative estimates.

The calibration device can be further configured to iteratively determine the error-function using the one or more closed-form solutions and by correcting distortions of respective lenses of the projector and the camera.

The projector image can comprise one or more of: a natural image; a non-structured light image; a cinema image; an image that includes representations of one or more of: man-made structures, man-made devices, natural structures; artificially generated content; combined natural-artificial content; augmented reality content; and structured-light-like markers comprising at least one of visible, invisible and infrared markers, added to customer content.

The calibration device can be further configured to determine the correspondence map using one or more of spatial features, temporal features, and spatio-temporal features.

The calibration device can be further configured to determine the correspondence map using one or more of: screen isolation, colour correction, optical flow estimation, and patch-based pixel correlation.

The features matched in the feature extraction can comprise one or more of: edges, patterns, areas that include colour changes, and areas that are unique within the projector image.

The feature extraction can comprise one or more of edge-guided extraction and non-edge guided extraction.

The correspondence map between the respective pixels of each of the projector image and the camera image can occur for up to about 80% of the respective pixels.

The error-function can comprise one or more of: a Sampson reprojection error; one or more constraints on respective focal lengths of one or more of the projector and the camera; and one or more constraints on respective principal points of one or more of the projector and the camera.

Iteratively determining the error-function can comprise one or more of: iteratively solving the error-function; iteratively solving the error-function using a Levenberg-Marquardt algorithm; and solving for respective lens distortion of the projector and the camera.

The calibration device can be further configured to determine respective intrinsic and extrinsic properties of the projector and the camera from current values of iterative estimates by: first determining the respective intrinsic properties; and then determining the respective extrinsic properties from the respective intrinsic properties and current values of the fundamental matrix obtained in the iterative processing of the error-function.

Another aspect of the specification provides a method comprising: at a system comprising: a calibration device; a projector; and a camera, a field of view of the camera at least partially overlapping a projection area of the projector, controlling, using the calibration device, the projector to project a projector image; receiving at the calibration device, a camera image from the camera, the camera image comprising the projector image as captured by the camera; determining, at the calibration device, a correspondence map between respective pixels of each of the projector image and the camera image in fewer than one hundred percent of pixels of the projector image by: using feature extraction to match features in the projector image and the camera image in the fewer than one hundred percent of the pixels in areas of the projector image; and, discarding the features that are indistinguishable from each other such that pixels in areas of the projector image associated with indistinguishable features are not mapped; determining, at the calibration device, an initial estimate of a fundamental matrix from the correspondence map, the fundamental matrix mapping each projector pixel to a line in the camera image; determining, at the calibration device, an initial guess of intrinsic properties of the projector and the camera by using one or more closed-form solutions; iteratively determining, at the calibration device, an error-function based on the correspondence map using the fundamental matrix while adding constraints on the respective intrinsic properties using the one or more closed-form solutions, and using the initial estimate of the fundamental matrix and the initial guess of intrinsic properties of the projector and the camera as initial input; and, when the error-function reaches an acceptance value, determining, at the calibration device, respective intrinsic properties and respective extrinsic properties of the projector and the camera from current values of iterative estimates.

The method can further comprise iteratively determining, at the calibration device, the error-function using the one or more closed-form solutions and by correcting distortions of respective lenses of the projector and the camera.

The projector image can comprise one or more of: a natural image; a non-structured light image; a cinema image; an image that includes representations of one or more of: man-made structures, man-made devices, natural structures; artificially generated content; combined natural-artificial content; augmented reality content; and structured-light-like markers comprising at least one of visible, invisible and infrared markers, added to customer content.

The method can further comprise determining, at the calibration device, the correspondence map using one or more of spatial features, temporal features, and spatio-temporal features.

The method can further comprise determining, at the calibration device, the correspondence map using one or more of: screen isolation, colour correction, optical flow estimation, and patch-based pixel correlation.

The features matched in the feature extraction can comprise one or more of: edges, patterns, areas that include colour changes, and areas that are unique within the projector image.

The feature extraction can comprise one or more of edge-guided extraction and non-edge guided extraction.

The correspondence map between the respective pixels of each of the projector image and the camera image can occur for up to about 80% of the respective pixels.

The error-function can comprise one or more of: a Sampson reprojection error; one or more constraints on respective focal lengths of one or more of the projector and the camera; and one or more constraints on respective principal points of one or more of the projector and the camera.

Iteratively determining the error-function can comprise one or more of: iteratively solving the error-function; iteratively solving the error-function using a Levenberg-Marquardt algorithm; and solving for respective lens distortion of the projector and the camera.

The method can further comprise determining, at the calibration device, respective intrinsic and extrinsic properties of the projector and the camera from current values of iterative estimates by: first determining the respective intrinsic properties; and then determining the respective extrinsic properties from the respective intrinsic properties and current values of the fundamental matrix obtained in the iterative processing of the error-function.

Another aspect of the specification provides a computer-readable medium storing a computer program, wherein execution of the computer program is for: at a system comprising: a calibration device; a projector; and a camera, a field of view of the camera at least partially overlapping a projection area of the projector, controlling, using the calibration device, the projector to project a projector image; receiving at the calibration device, a camera image from the camera, the camera image comprising the projector image as captured by the camera; determining, at the calibration device, a correspondence map between respective pixels of each of the projector image and the camera image in fewer than one hundred percent of pixels of the projector image by: using feature extraction to match features in the projector image and the camera image in the fewer than one hundred percent of the pixels in areas of the projector image; and, discarding the features that are indistinguishable from each other such that pixels in areas of the projector image associated with indistinguishable features are not mapped; determining, at the calibration device, an initial estimate of a fundamental matrix from the correspondence map, the fundamental matrix mapping each projector pixel to a line in the camera image; determining, at the calibration device, an initial guess of intrinsic properties of the projector and the camera by using one or more closed-form solutions; iteratively determining, at the calibration device, an error-function based on the correspondence map using the fundamental matrix while adding constraints on the respective intrinsic properties using the one or more closed-form solutions, and using the initial estimate of the fundamental matrix and the initial guess of intrinsic properties of the projector and the camera as initial input; and, when the error-function reaches an acceptance value, determining, at the calibration device, respective intrinsic properties and respective extrinsic properties of the projector and the camera from current values of iterative estimates. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
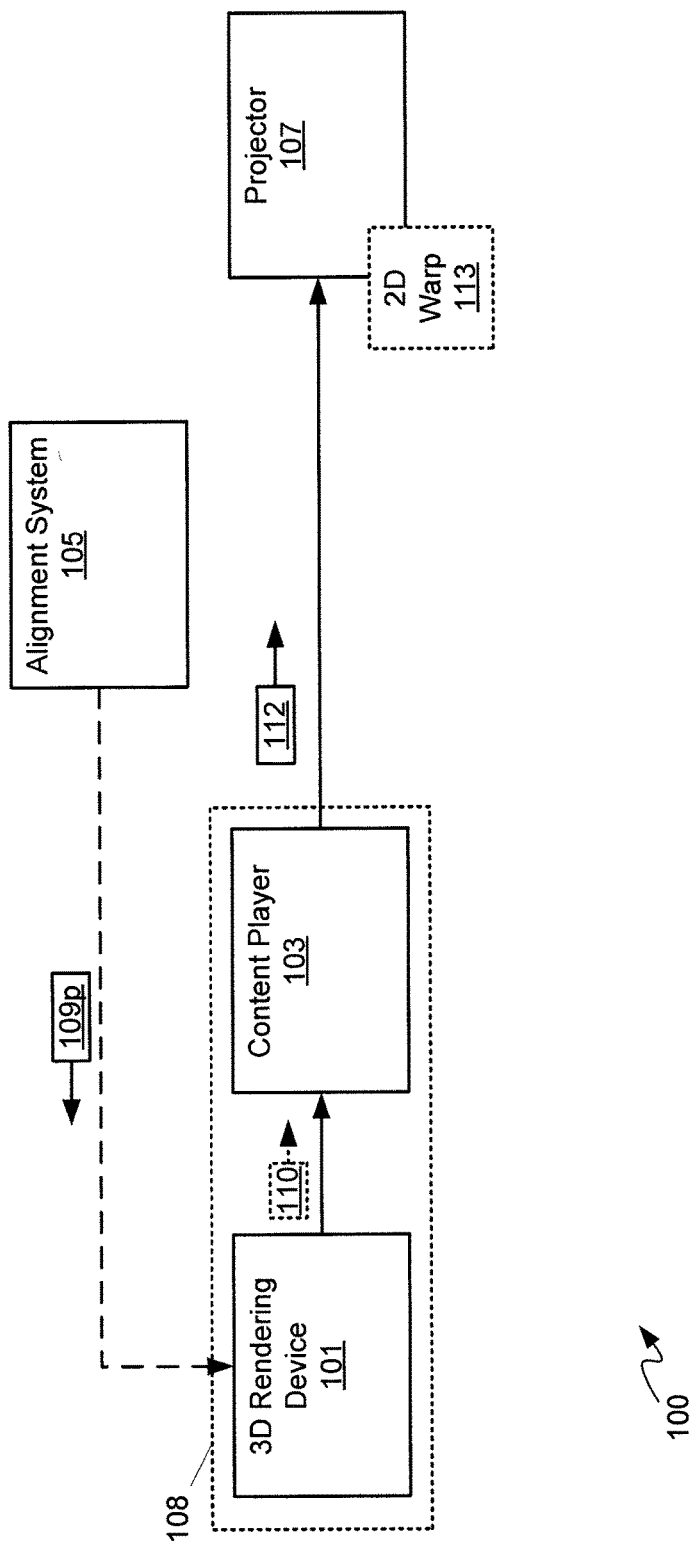
FIG. 1 depicts a projection system, according to non-limiting implementations.

FIG. 1 depicts a system 100 comprising: a 3D ("three-dimensional") rendering device 101 (interchangeably referred to hereafter as device 101); a content player 103; an alignment system 105; and a projector 107. In general, device 101 is in communication with content player 103 and alignment system 105, and content player 103 is in communication with projector 107. As depicted, device 101 and content player 103 are combined into one device 108, however in other implementations device 101 and content player 103 are separate devices. Alignment system 105 is configured to generate pose data 109$p$ corresponding to projector 107, and communicate pose data 109$p$ to device 101, as described in further detail below. Device 101 can generate rendered image data 110 from pose data 109$p$, for example by rendering existing image data (not depicted) for projection by projector 107. In FIG. 1, solid lines connecting components show flow of image and/or video data there between, while the stippled line connecting alignment system 105 to device 101 and/or device 108 shows flow of pose data 109$p$ there between. Pose data 109$p$ generally represents a calibration of system 100 to account for a position of projector 107 and/or positions of objects upon which images are to be projected. Hence pose data 109$p$ can also be referred to as calibration data.

When device 101 and content player 103 are separate, device 101 communicates image data 110 to content player 103, which processes and/or "plays" image data 110 by producing projection data 112 suitable for processing and projection by projector 107. For example, image data 110 can include, but is not limited to, an AVI file, a series of JPG files, a PNG file, and the like. Projection data 112 can include, but is not limited to, HDMI data, VGA data, and/or video transport data. When device 101 and content player 103 are combined in device 108, device 108 can render projection data 112 (e.g. video data) in real-time without producing image data 110. In any event, projection data 112 is communicated to projector 107 by content player 103 where projection data 112 is used to control projector 107 to project images based thereupon, for example onto a three-dimensional object.

Device 101 generally comprises an image generator and/or renderer, for example a computing device, a server and the like, configured to generate and/or render images as image data 110. Such image data 110 can include, but is not limited to, still images, video and the like. Furthermore, while not depicted device 101 can be in communication with, and/or comprise, an image generator and/or a memory storing data from which image data 110 can be generated and/or rendered. Alternatively, device 101 can generate image data 110 using algorithms, and the like, for generating images.

Content player 103 comprises a player configured to "play" and/or render image data 110; for example, when image data 110 comprises video data, content player 103 is configured to play and/or render the video data by outputting projection data 112 for projection by projector 107. Hence, content player 103 can include, but is not limited to a video player, a video processing device, a computing device, a server, and the like. However, as described above, when device 101 and content player 103 are combined as device 108, rendering of image data 110 can be eliminated and device 108 renders projection data 112 without producing image data 110.

Alignment system 105 comprises any suitable combination of projectors (including projector 107), cameras (not depicted in FIG. 1), and computing devices configured to one or more of: automatically determine parameters of projector 107; and automatically determine a location and orientation of a three-dimensional object onto which images are to be projected. Non-limiting implementations of alignment system 105 will be described below with reference to FIGS. 2 to 9.

Projector 107 comprises a projector configured to project projection data 112, including but not limited to a digital projector, a cinema projector, an LCOS (Liquid Crystal on Silicon) based projector, a DMD (digital multimirror device) based projector and the like. Furthermore, while only one projector 107 is depicted, system 100 can comprise a plurality of projectors 107, each configured to project respective projection data comprising, for example, portions of larger tiled image to be projected.

As depicted system 100 further comprises one or more 2D ("two-dimensional") warping devices and/or modules 113, for example at projector 107 (though such a warping device can be present at content player and/or as a stand-alone device) When present, projection data 112 can be warped by warping module 113, for example by moving and/or adjusting pixels within projection data 112, to adjust projection data 112 for projection by projector 107 onto a three-dimensional object. However, as alignment system determines pose data 109p and communicates such to device 101 (and/or device 108), warping module 113 can be unused, optional and/or eliminated from system 100. Indeed, use of warping module 113 represents how images were processed according to the prior art and the presence of warping module 113 is obviated by virtue of alignment system 105 providing device 101 (and/or device 108) with pose data 109p. However, in some implementations, warping module 113 can be used to make small changes to projection of images onto a physical object, for example when a virtual model of the object used to produce the images does not precisely match the physical object.

While each of device 101, content player 103, alignment system 105, and projector 107 are depicted as distinct components, in other implementations, respective portions of one or more of device 101, content player 103, alignment system 105, and projector 107 and can be implemented within the same device (e.g. device 108) and/or processing resources can be shared there between. For example, while not depicted, system 100 comprises one or more processors, one or more memories and one or more communication interfaces, for example a processor, memory and communication interface for each of device 101, content player 103, alignment system 105, and projector 107 and/or to be shared among device 101, content player 103, alignment system 105, and projector 107. Indeed, in general, components of system 100, as depicted, represent different functionality of a projection system where: parameters of projector 107 can be automatically determined, and automatically adjusted when projector 107 moves; a location and orientation of a three-dimensional object onto which images are to be projected can be automatically determined (and automatically adjusted when the three-dimensional object moves); and images are adjusted for projection onto the three-dimensional object.

Figure 2:
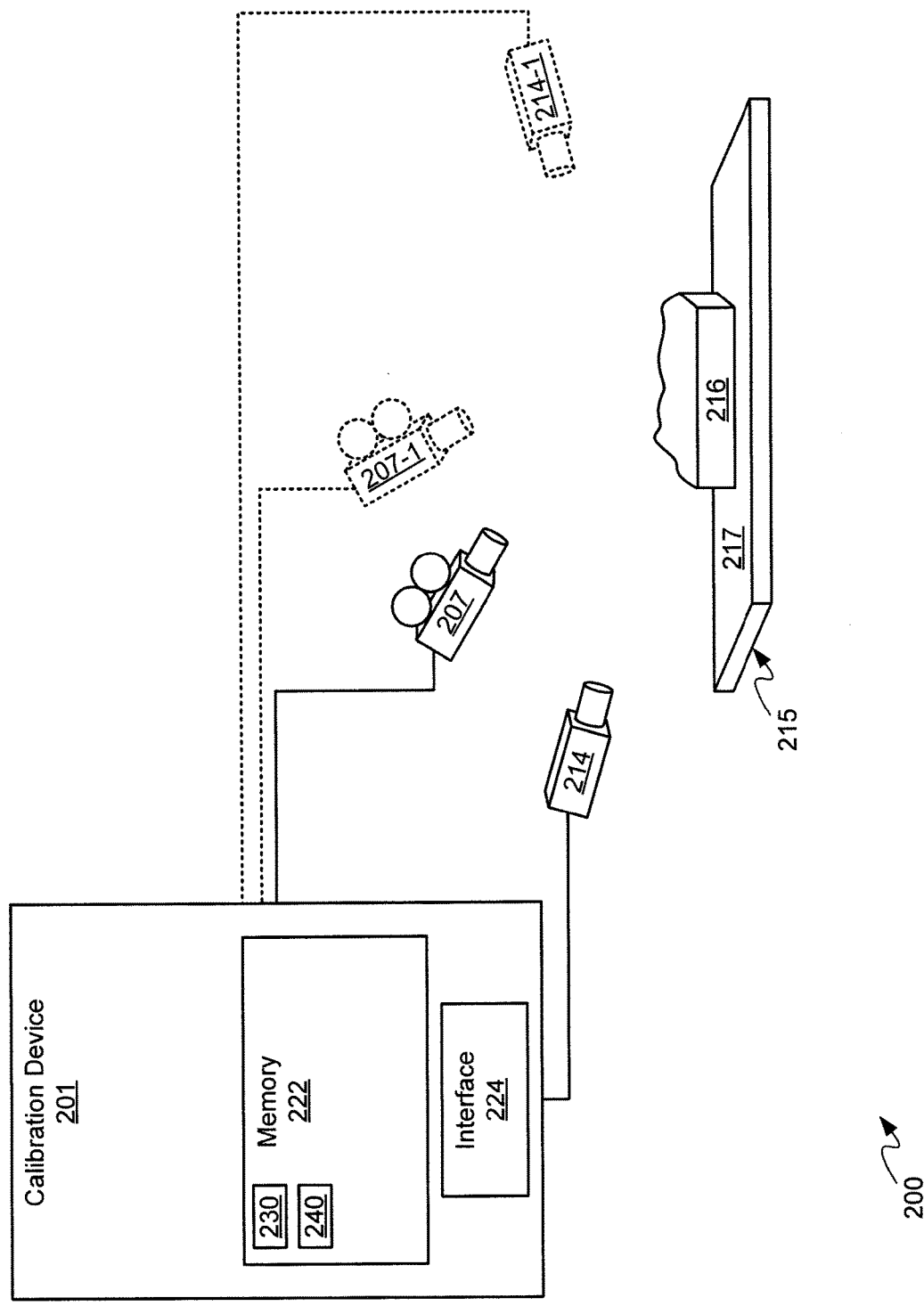
FIG. 2 depicts a system for online projector-camera calibration from one or more images, which can be used in the system of FIG. 1, according to non-limiting implementations.

Attention is next directed to FIG. 2 which depicts a system 200 for online projector-camera calibration from one or more images. Indeed, alignment system 105 can comprise system 200, and furthermore components of system 100 can comprise components of system 200 as desired. System 200 comprises a calibration device 201, a projector 207; and a camera 214 (though system 200 can comprise more than one projector and more than one camera, respectively represented by optional projector 207-1 and optional camera 214-1), a field of view of camera 214 at least partially overlapping a projection area of projector 207. For example, as depicted, projector 207 is located to project onto a three-dimensional environment that includes a three-dimensional object 216 on a flat (e.g. two-dimensional) surface 217, and camera 214 is aimed at environment 215 at a position and orientation where a field of view of camera 214 at least partially overlapping a projection area of projector 207. Hence, when projector 207 projects images onto environment 215, camera 214 captures an image of the projected image.

As depicted, three-dimensional environment 215 comprises a three-dimensional and/or physical object 216 on a flat surface 217, however, in other implementations, three-dimensional environment 215 (interchangeably referred to hereafter as environment 215) can comprise one or more of: a physical object on a surface; a curved surface; an irregular surface, and the like. Indeed, environment 215 can comprise any objects and/or environment having depth onto which images are to be projected.

In general, projector 107 can comprise projector 207, alignment system 105 can comprise calibration device 201, projector 207 and camera 214, and any of device 101 and content player 103 can comprise at least a portion of calibration device 201, for example when resources are shared amongst device 101, content player 103 and alignment system 105.

Camera 214 can comprise one or more of a digital camera, a CCD (charge coupled device) and the like.

Furthermore, while present methods and/or processes are described herein with reference to one projector 207 and one camera 214, system 200 can comprise a plurality of projectors and/or a plurality of cameras (e.g. including projectors 207, 207-1 and cameras 214, 214-1), with respective fields of view of at least a subset of the cameras overlapping respective projection areas of projectors. Indeed, present methods and/or processes as described herein can be applied to any projector-camera pair where a field of view of the camera at least partially overlaps a projection area of the projector.

Calibration device 201, interchangeably referred to hereafter as device 201 can comprise any suitable computing device, including but not limited to a graphics processing unit (GPU), a graphics processing device, a graphics processing engine, a video processing device, a personal computer (PC), a server, and the like, and generally comprises a memory 222 and a communication interface 224 (interchangeably referred to hereafter as interface 224) and optionally any suitable combination of input devices and display devices.

Calibration device 201 can further comprise a processor and/or a plurality of processors, including but not limited to one or more central processors (CPUs) and/or one or more processing units and/or one or more graphic processing units (GPUs); either way, calibration device 201 comprises a hardware element and/or a hardware processor. Indeed, in some implementations, calibration device 201 can comprise an ASIC (application-specific integrated circuit) and/or an FPGA (field-programmable gate array) specifically configured to implement the functionality of calibration device 201. Hence, calibration device 201 is not necessarily a generic computing device and/or a generic processor and/or a generic component of computing device 201, but a device specifically configured to implement specific functionality; such specific functionality includes generating respective intrinsic properties and respective extrinsic properties of projector 207 and camera 214 as described in further detail below. For example, calibration device 201 can specifically comprise an engine configured to generate respective intrinsic properties and respective extrinsic properties of projectors and cameras.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 201 as described herein are typically maintained, persistently, in memory 222 and used by device 201 which makes appropriate utilization of volatile storage during the execution of such programming instructions. Those skilled in the art recognize that memory 222 is an example of computer readable media that can store programming instructions executable on device 201. Furthermore, memory 222 is also an example of a memory unit and/or memory module and/or a non-volatile memory.

In particular, memory 222 stores an application 230 and at least one projector image 240 to be projected by projector 207. At least one projector image 240 will be interchangeably referred to hereafter as projector image 240 and generally comprises one or more of: a natural image; a non-structured light image; a cinema image; an image that includes representations of one or more of: man-made structures, man-made devices, natural structures; artificially generated content; combined natural-artificial content; augmented reality content; and structured-light-like markers comprising at least one of visible, invisible and infrared markers, added to customer content. For example, projector image 240 can be an image from a video to be projected by projector 207 in an in-use situation, for example to illuminate environment 215 in projector mapping scenarios for entertainment, advertising, gaming, immersive environments, and the like. As such, projector image 240 can exclude structured-light patterns used for off-line calibration of system 200 (though methods and processes herein can also be applied to structured-light patterns).

It is assumed that projector image 240 generally comprises at least a minimum number of features that are distinguishable from each other; for example, computationally using techniques described herein, such a minimum can be eight features, however in practise methods and processes described herein become more accurate as the number of distinguishable features in projector image 240 increases. However, as will be described below, it is not necessary for all features and/or pixels in projector image 240 to be distinguishable from each other.

Furthermore, when application 230 is implemented by device 201, device 201 is generally configured to: control projector 207 to project projector image 240; receive a camera image from camera 214, the camera image comprising projector image 240 as captured by camera 214; determine a correspondence map between respective pixels of each of projector image 240 and the camera image in fewer than one hundred percent of pixels of projector image 240 by: using feature extraction to match features in projector image 240 and the camera image in the fewer than one hundred percent of the pixels in areas of projector image 240; and, discarding the features that are indistinguishable from each other such that pixels in areas of projector image 240 associated with indistinguishable features are not mapped; determine an initial estimate of a fundamental matrix from the correspondence map, the fundamental matrix mapping each projector pixel to a line in the camera image; determine an initial guess of intrinsic properties of projector 207 and camera 214 by using one or more closed-form solutions; iteratively determine an error-function based on the correspondence map using the fundamental matrix while adding constraints on the respective intrinsic properties using the one or more closed-form solutions, and using the initial estimate of the fundamental matrix and the initial guess of intrinsic properties of the projector and the camera as initial input; and, when the error-function reaches an acceptance value, determine respective intrinsic properties and respective extrinsic properties of projector 207 and camera 214 from current values of iterative estimates. Device 201 can be optionally configured to determine the error-function using the one or more closed-form solutions and by correcting distortions of respective lenses of the projector and the camera correcting distortions of respective lenses of projector 207 and camera 214.

Interface 224 comprises any suitable wired or wireless communication interface configured to communicate with projector 207 and camera 214 (and any of device 101, content player 103, alignment system 105, and device 108) in a wired and/or wireless manner as desired.

Figure 3:
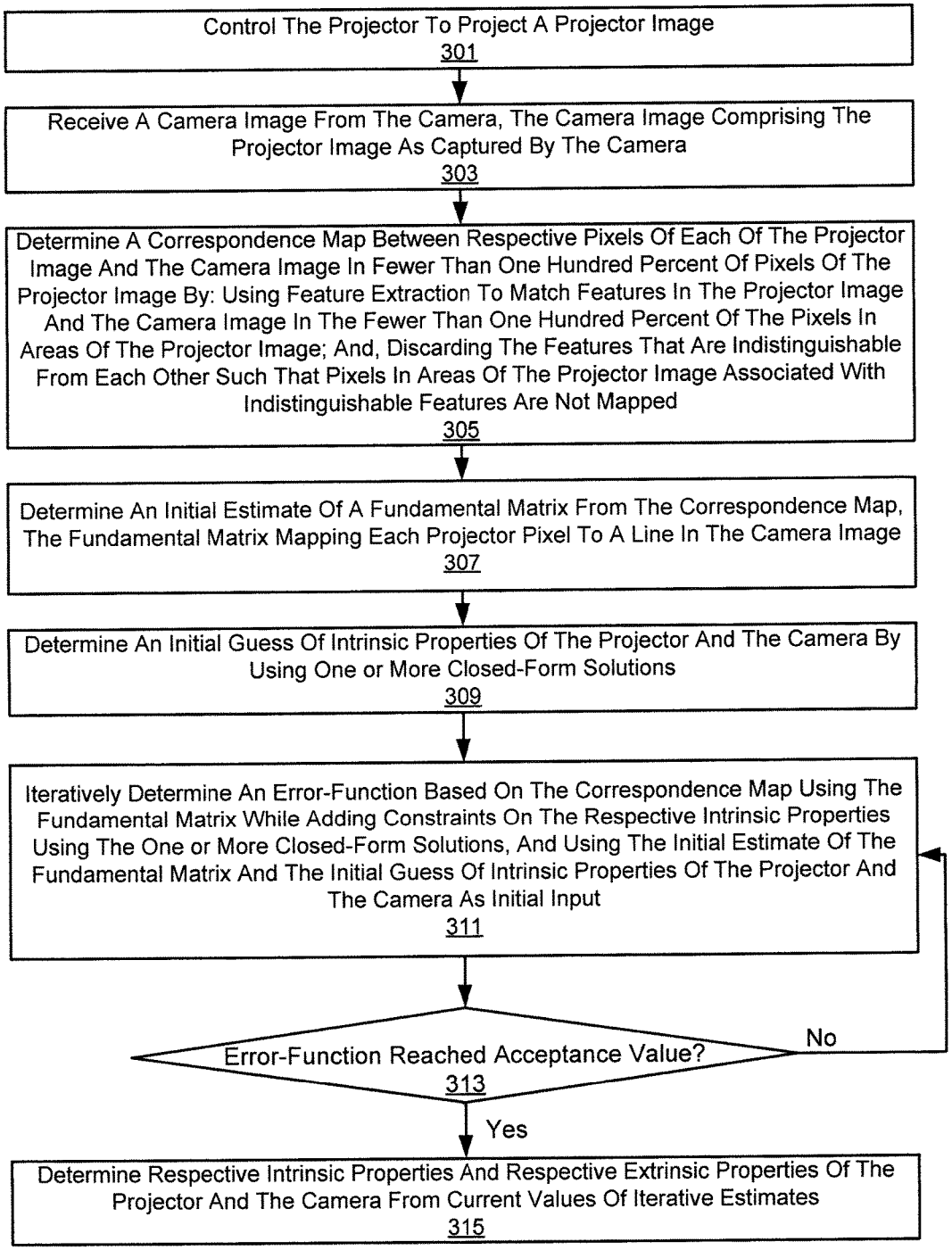
FIG. 3 depicts a method for online projector-camera calibration from one or more images, according to non-limiting implementations.

Attention is now directed to FIG. 3 which depicts a flowchart of a method 300 for online projector-camera calibration from one or more images, according to non-limiting implementations. In order to assist in the explanation of method 300, it will be assumed that method 300 is performed using system 200, and specifically by device 201, for example when device 201 processes application 230. Indeed, method 300 is one way in which system 200 and/or device 201 can be configured. Furthermore, the following discussion of method 300 will lead to a further understanding of device 201, and system 200 and its various components. However, it is to be understood that system 200 and/or device 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well. Furthermore, while calibration device 201 is described as implementing and/or performing each block of method 300, it is appreciated that each block of method 300 occurs using device 201 processing application 230.

At block 301, device 201 controls projector 207 to project projector image 240.

At block 303, device 201 receives a camera image from camera 214, the camera image comprising projector image 240 as captured by camera 214

At block 305, device 201 determines a correspondence map between respective pixels of each of projector image 240 and the camera image in fewer than one hundred percent of pixels of projector image 240 by: using feature extraction to match features in projector image 240 and the camera image in the fewer than one hundred percent of the pixels in areas of projector image 240; and, discarding the features that are indistinguishable from each other such that pixels in areas of projector image 240 associated with indistinguishable features are not mapped.

At block 307, device 201 determines an initial estimate of a fundamental matrix from the correspondence map, the fundamental matrix mapping each projector pixel to a line in the camera image At block 309, device 201 determines an initial guess of intrinsic properties of projector 207 and camera 214 by using one or more closed-form solutions.

At block 311, device 201 iteratively determines an error-function based on the correspondence map using the fundamental matrix while adding constraints on the respective intrinsic properties using the one or more closed-form solutions, and using the initial estimate of the fundamental matrix and the initial guess of intrinsic properties of projector 207 and camera 214 as initial input. Furthermore, at block 311, device 201 can optionally determine the error-function using the one or more closed-form solutions and by correcting distortions of respective lenses of the projector and the camera correcting distortions of respective lenses of projector 207 and camera 214.

At block 313, device 201 determines whether the error-function has reached an acceptance value. When a "No" decision occurs at block 313, iterative determination of the error-function continues.

However, when a "Yes" decision occurs at block 313, and hence the error-function has reached an acceptance value, at block 315, device 201 determines respective intrinsic properties and respective extrinsic properties of projector 207 and camera 214 from current values of iterative estimates.

Method 300 will now be described with reference to FIG. 4 to FIG. 9, with each of FIGS. 4, 5, 7, 8 and 9 each being substantially similar to FIG. 2, with like elements having like numbers.

Figure 4:
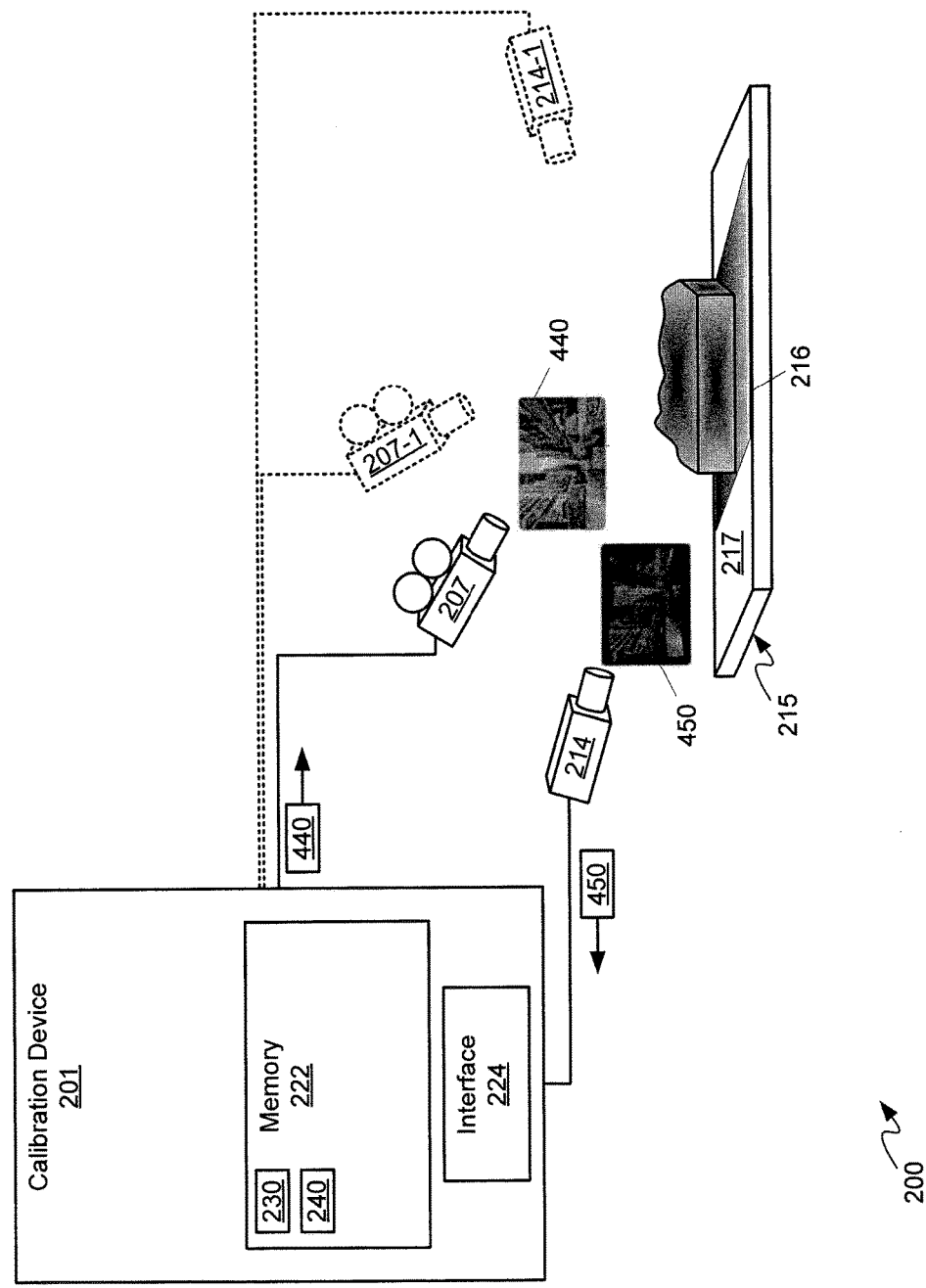
FIG. 4 depicts a projector of the system of FIG. 2 projecting a projector image onto a three-dimensional environment and a camera capturing a camera image of the projector image as projected onto the three-dimensional environment, according to non-limiting implementations.

In FIG. 4, projector 207 is depicted as being controlled to project a projector image 440 (e.g. at block 301) which can comprise, for example, an image in a stream of images to be projected by projector 207 in a normal use scenario as described above (e.g. in an "on-line" scenario and not in an "off-line" or dedicated calibration scenario). In other words, projector 207 projects at least one projector image 240, including projector image 440, comprising, for example, a natural image (and not a dedicated calibration image, such as a structured light pattern), as part of normal operation of system 200. As on-line calibration described herein will be used to later warp and/or adjust images being projected onto environment 215 using respective intrinsic properties and respective extrinsic properties of projector 207 and camera 214 as determined from the on-line calibration, projector image 440 can comprise an image that is towards a beginning of a stream images to be projected by projector 207 such that the on-line calibration can occur early on in the normal use scenario.

Furthermore, it is assumed that projector image 440 generally comprises at least a minimum number of features that are distinguishable from each other such that implementation of method 300 results in the error-function converging towards an acceptance value and/or reaching the acceptance value at blocks 311, 313. When the error-function does not converge and/or reach the acceptance value, for example after a given time period, another projector image from the stream of images can be used to re-implement method 300.

In any event, FIG. 4 further depicts environment 215 illuminated with projector image 440, as schematically indicated by shading on environment 215. FIG. 4 further depicts camera 214 acquiring a camera image 450 comprising projector image 440 as captured by camera 214, for example when projector image 440 is illuminating environment 215. As a field of view of camera 214 at least partially overlaps a projection area of projector 207, at least a subset of features in camera image 450 comprises at least a subset of respective features in projector image 440. However camera image 450 is generally distorted relative to projector image 440 due to relative difference in locations and orientations of each of camera 214, projector 207 and environment 215, and the distortions caused by projector image 440 interacting with environment 215. For example camera image 450 is at least skewed relative to projector image 440 due at least to the relative difference in locations and orientations of each of camera 214, projector 207 and environment 215; however, discontinuities and distortions can also occur in camera image 450 relative to projector image 440 due at least to environment 215 being three-dimensional and/or rough and the like.

Figure 5:
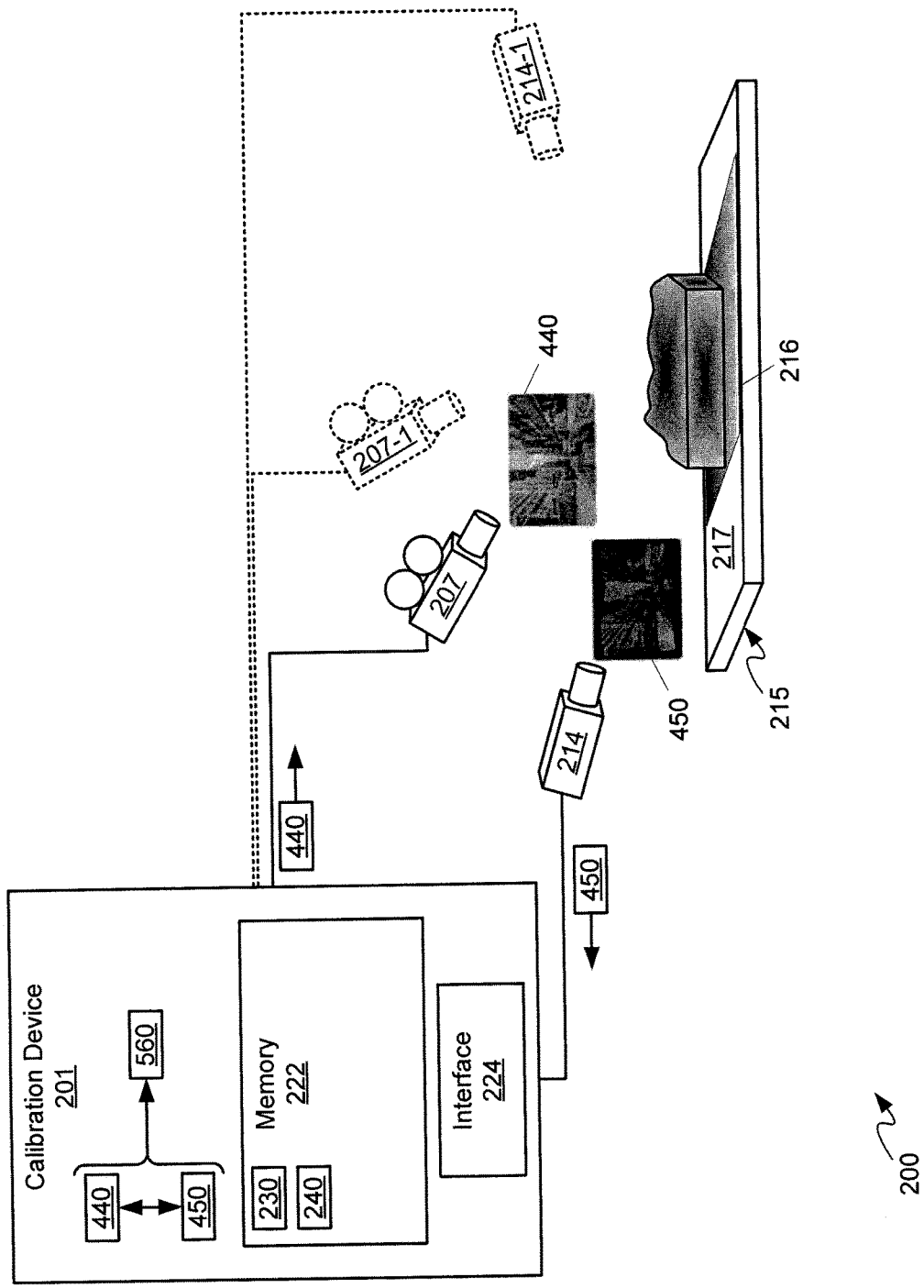
FIG. 5 depicts a calibration device of the system of FIG. 2 determining a sparse correspondence map between the projector image and the camera image, according to non-limiting implementations.

Attention is next directed to FIG. 5, which depicts device 201 (e.g. at block 305) determining a correspondence map 560 by comparing projector image 440 to camera image 450. In particular device 201 determines correspondence map 560 between respective pixels of each of projector image 440 and camera image 450 in fewer than one hundred percent of pixels of projector image 440 by: using feature extraction to match features in projector image 440 and camera image 450 in the fewer than one hundred percent of the pixels in areas of projector image 440; and, discarding the features that are indistinguishable from each other such that pixels in areas of projector image 440 associated with indistinguishable features are not mapped.

Figure 6:
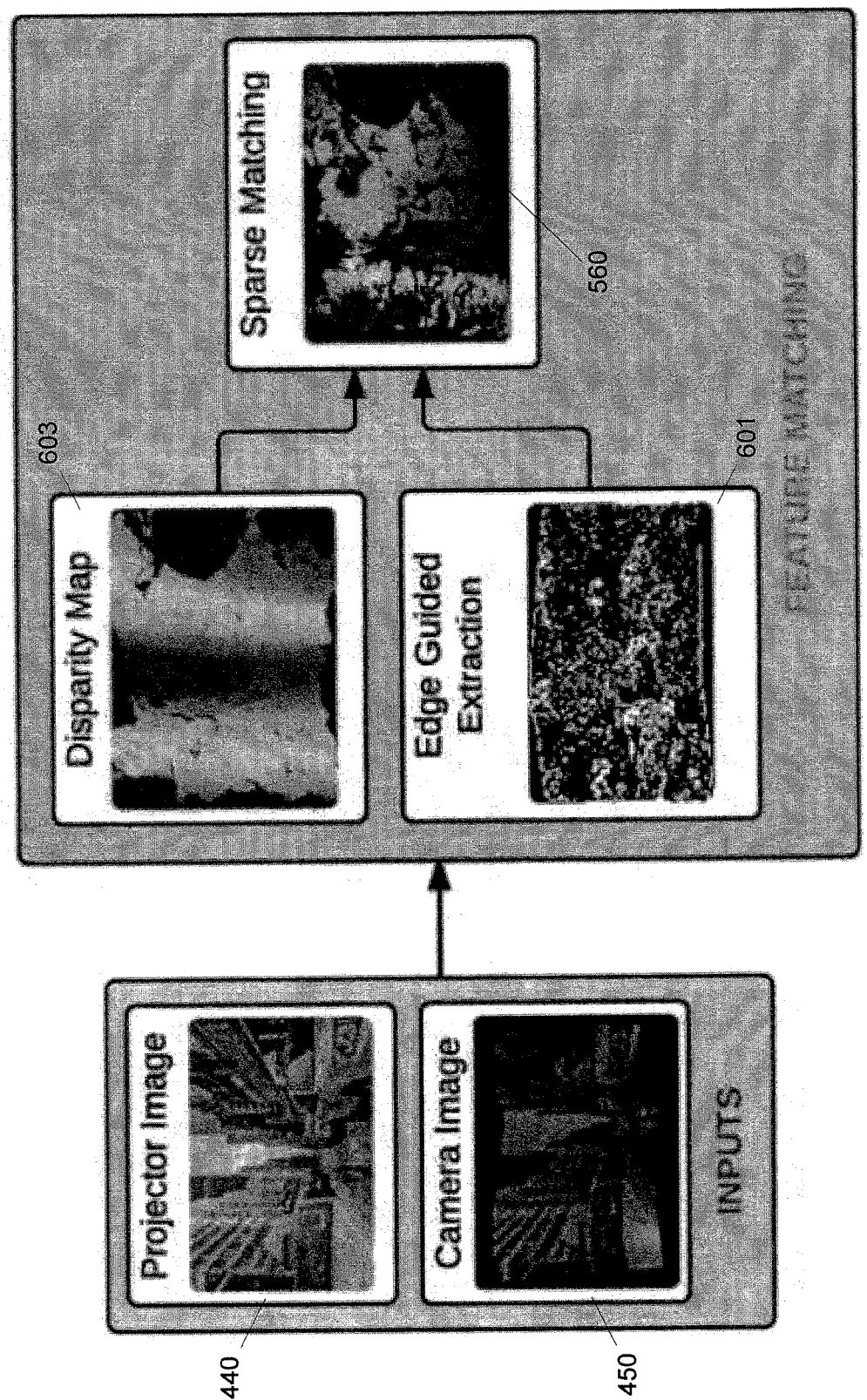
FIG. 6 depicts a schematic graphical representation of the generation of the sparse correspondence map, according to non-limiting implementations.

For example, attention is next directed to FIG. 6 which depicts a graphical representation of non-limiting implementations of a determination of correspondence map 560. For example, both of projector image 440 and camera image 450 are used as input. A comparison there between is made to match features that occur in both projector image 440 and camera image 450. For example, graphical processing techniques such as edge-guided extraction (as depicted) can be used to match features, as represented by features 601. However, any features can be used in determining correspondence map 560; for example, features matched in the feature extraction of block 305 can include, but are not limited to, one or more of: edges, patterns, areas that include colour changes, and areas that are unique within projector image 440.

Put another way, device 201 is further configured to determine correspondence map 560 using one or more of spatial features, temporal features, and spatio-temporal features; for example, temporal features and/or spatio-temporal features can comprises features that are moving in projector image 440. In any event, the feature extraction of block 305 can comprise one or more of edge-guided extraction and non-edge guided extraction.

For example, as depicted, each of projector image 440 and camera image 450 comprises buildings, cars, clouds, and the like, and device 201 compares projector image 440 and camera image 450 to find areas in each of projector image 440 and camera image 450 that uniquely correspond to one another. Areas that correspond to one another but are not unique (for example features that appear similar to each other) are discarded. In areas that uniquely correspond to each other pixel matching occurs. As an intermediate step a correspondence map 603 (also referred to in this configuration as disparity map, as depicted in FIG. 6) can be generated which comprises a collection of vectors that represent displacements between each pixel of original projector image 440 and camera image 450. As graphically depicted in FIG. 6, gaps in correspondence map 560 represent areas where features could not be uniquely matched.

Other graphical processing techniques can be used in determination of correspondence map 560 including, but not limited to, one or more of screen isolation, colour correction, optical flow estimation, and patch-based pixel correlation. For example, in screen isolation, areas of camera image 450 that are not part of projector image 440 are discarded. In colour correction, differences in colour between projector image 440 and camera image 450 are corrected, for example using histogram techniques. In optical flow estimation, sequences of images can be used to estimate motion there between, and hence, when optical flow estimation is used in determination of correspondence map 560 can include comparing a plurality of projector images with a plurality of camera images to determine features in each that are moving. In patch-based pixel correction, areas of pixels are defined in projector image 440 and camera image 450 and compared to determine correlations and/or correspondences there between.

In any event, it is appreciated that, in determining correspondence map 560, only a subset of pixels are mapped between projector image 440 and camera image 450 as inconsistent matches are discarded where features cannot be uniquely matched. In some implementations, correspondence map 560 between the respective pixels of each of projector image 440 and camera image 450 occurs for up to about 80% of the respective pixels, however the actual number of pixels that are matched can depend on projector image 440 and the number of uniquely identifiable features therein. In principle, techniques described herein can be used when as few as eight pixels are matched between projector image 440 and camera image 450, however accuracy increases as the number of uniquely identifiable features and/or as the number of matched pixels increases. Furthermore, the accuracy of the matching can be controlled by controlling the acceptance value used in block 313; for example, when projector image 440 is known to be relatively uniform (e.g. with a relatively small number of unique features), the acceptance value can be raised and, similarly, when projector image 440 is known to be relatively non uniform (e.g. with a relatively large number of unique features), the acceptance value can be lowered.

Figure 7:
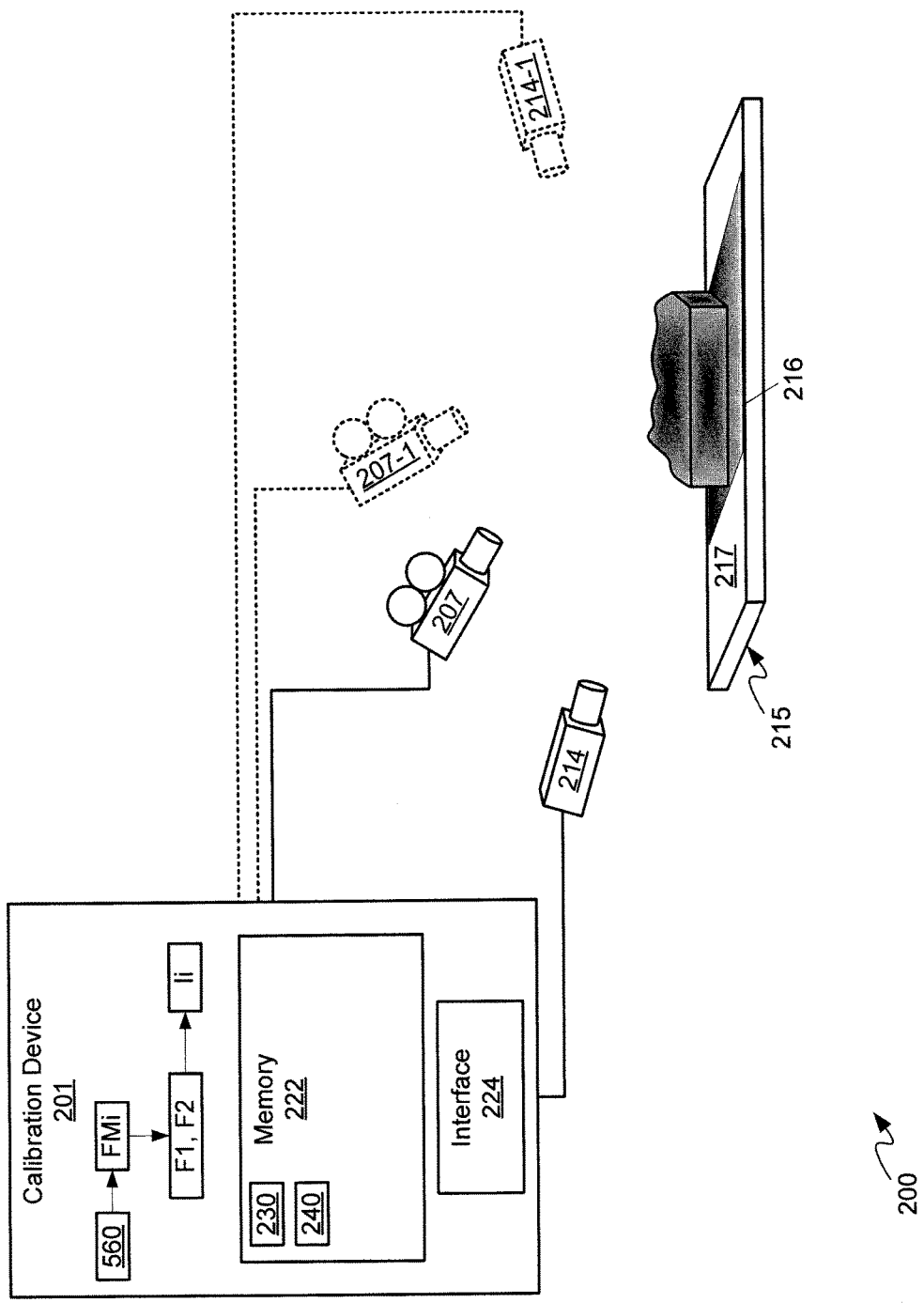
FIG. 7 depicts the calibration device of the system of FIG. 2 determining an initial estimate of a fundamental matrix and an initial estimate of intrinsic properties of the projector and the camera, according to non-limiting implementations.

In any event, attention is next directed to FIG. 7 which depicts device 201 (e.g. at block 307) determining an initial estimate FMi of a fundamental matrix of system 200 from correspondence map 560. For example, a fundamental matrix of a projector-camera system generally maps each projector pixel to a line in a camera image (e.g. using an Epipolar constraint); hence, as correspondence map 560 generally maps respective pixels of each of projector image 440 and camera image 450 (and can comprise), an initial estimate FMi of the fundamental matrix of system 200 (and specifically a fundamental matrix of projector 207 and camera 214) can be determined therefrom.

FIG. 7 further depicts device 201 (e.g. at block 309) determining an initial guess Ii of intrinsic properties of the projector and the camera by using one or more closed-form solutions F1, F2, which can be integrated into application 230. In general, closed-form solutions of projector-camera systems can be expressed as one or more of:

$$F1(fp,fc,pp,pc,FM)=0 \qquad \text{Equation (1)}$$

$$F2(fp,fc,FM)=0 \qquad \text{Equation (2)}$$

where: fp comprises an estimated focal length of projector 207, fc comprises an estimated focal length of camera 214, pp comprises an estimated principal point of projector 207, pc comprises an estimated principal point of camera 214, and FM is an estimate of the fundamental matrix.

In some implementations, error function EF can incorporate reprojection error, RPE, which takes into account the pixel mapping between the projector 207 and camera 214:

$$RPE(fp,fc,pp,pc,dp,dc,FM)=0 \qquad \text{Equation (3)}$$

where dp comprises an estimated lens distortion of projector 207, and dc comprises an estimated lens distortion of camera 214. For example, in some implementations, RPE can comprise a first order approximation of Sampson reprojection error.

In general, closed-form solution F1 is a function that relates fp, fc, pp, pc and FM, closed-form solution F2 is a function that relates fp, fc and FM. The reprojection error RPE is a function that relates fp, fc, pp, pc, dp, dc and FM. In general, such functions are known to persons skilled in the art of multiple view geometries in computer vision, and indeed other suitable functions will occur to such persons of skill in the art.

Hence, each of fp, fc, pp, pc, dp, dc are intrinsic properties of projector 207 and camera 214.

In any event, as also depicted in FIG. 7, an initial estimate FMi of the fundamental matrix is used as initial input to one or more of closed-form solutions F1, F2 to determine an initial estimate Ii of intrinsic properties of projector 207 and camera 214. For example, intrinsic properties of projector 207 and camera 214 can include fp, fc, pp, pc, dp, dc; the subset of intrinsic properties that are determined hence depends on which closed-form solutions F1, F2 are used to determine the initial estimate Ii of intrinsic properties of projector 207 and camera 214.

Figure 8:
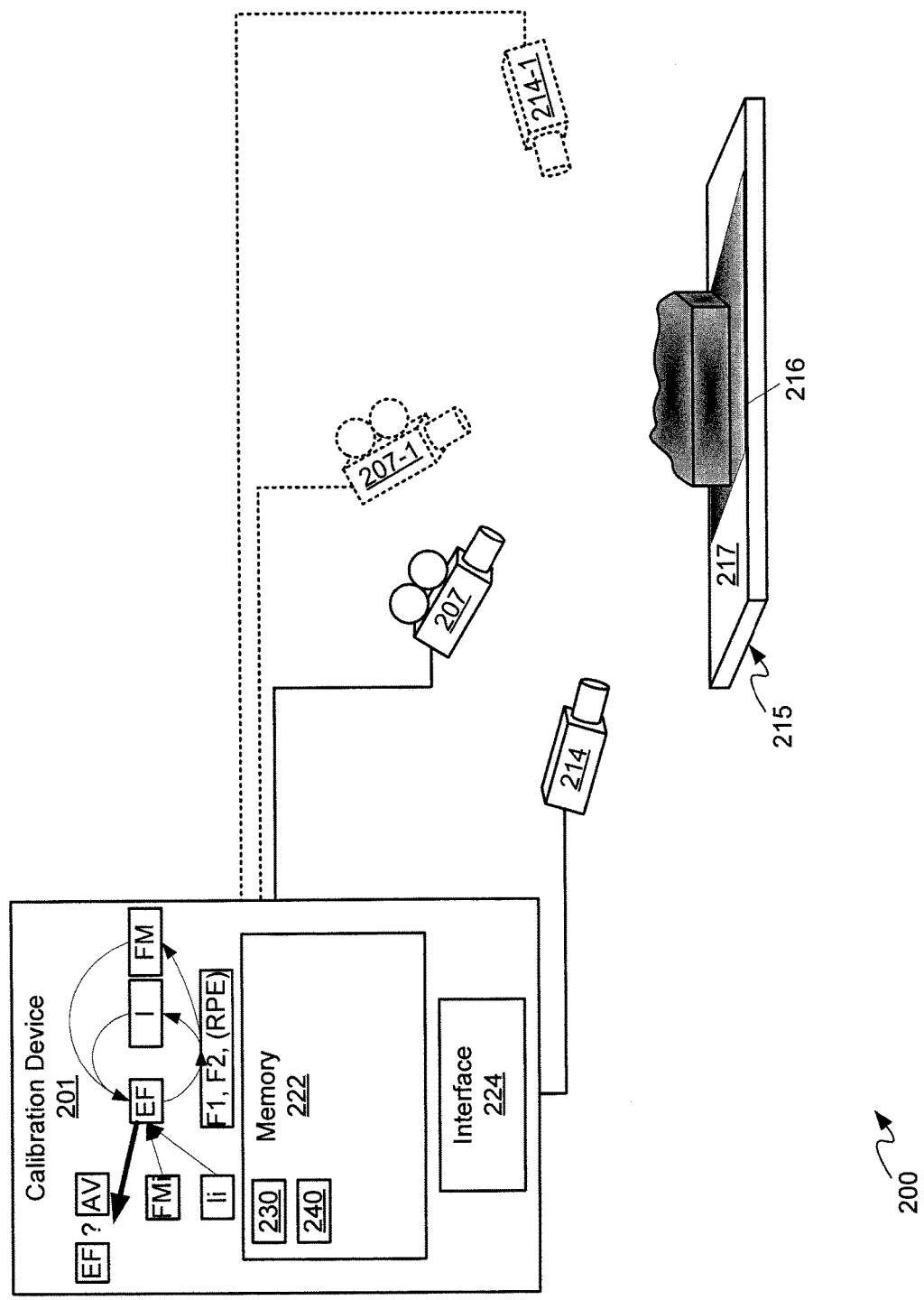
FIG. 8 depicts the calibration device of the system of FIG. 2 iteratively determining an error function, according to non-limiting implementations.

In any event, attention is next directed to FIG. 8 which depicts device 201 (e.g. at block 311) iteratively determining (e.g. at block 311) an error-function EF based on correspondence map 560 using the fundamental matrix FM while adding constraints on the respective intrinsic properties I using the one or more closed-form solutions F1, F2, and alternatively correcting distortions of respective lenses of projector 207 and camera 214 via the reprojection error RPE, using the initial estimate FMi of the fundamental matrix and the initial guess Ii of intrinsic properties of projector 207 and camera 214 as initial input.

For example, error function EF can comprise one or more of: a Sampson reprojection error; one or more constraints on respective focal lengths of one or more of projector 207 and camera 214; and one or more constraints on respective principal points of one or more of projector 207 and camera 214. For example, while Sampson reprojection error can be used, other error functions that take into account respective constraints on respective focal lengths and/or respective principal points projector 207 and camera 214 are within the scope of present implementations.

Either way, the initial estimate FMi of the fundamental matrix and the initial estimate Ii of the intrinsic properties can be used to initially calculate an initial value of the error function EF. The initial value of the error function EF is stored, for example in memory 222, and values of the intrinsic properties I and the fundamental matrix FM are perturbed and/or varied, with constraints placed thereupon using one or more of the closed-form solutions F1, F2; the error function EF is redetermined and compared with an acceptance value AV. In general, trends in the error function EF are tracked as the values of the intrinsic properties I and the fundamental matrix FM are perturbed and/or varied, in order to minimize and/or reduce the error function EF. This process continues, iteratively, until the error function reaches and/or falls below the acceptance value.

In particular, such iterative determination of the error function EF can comprise one or more of: iteratively solving the error-function; iteratively solving the error-function using a Levenberg-Marquardt algorithm; and solving for respective lens distortion of projector 207 and camera 214. For example, when solving for respective lens distortion, reprojection error RPE can be used when placing constraints on the intrinsic properties. Furthermore, while the Levenberg-Marquardt algorithm comprises a specific damped least-squares (DLS) method for curve fitting (e.g. to fit the error function EF to an acceptance value AV), other types of methods for optimizing the error function EF with respect to an acceptance value AV are within the scope of present implementations.

Figure 9:
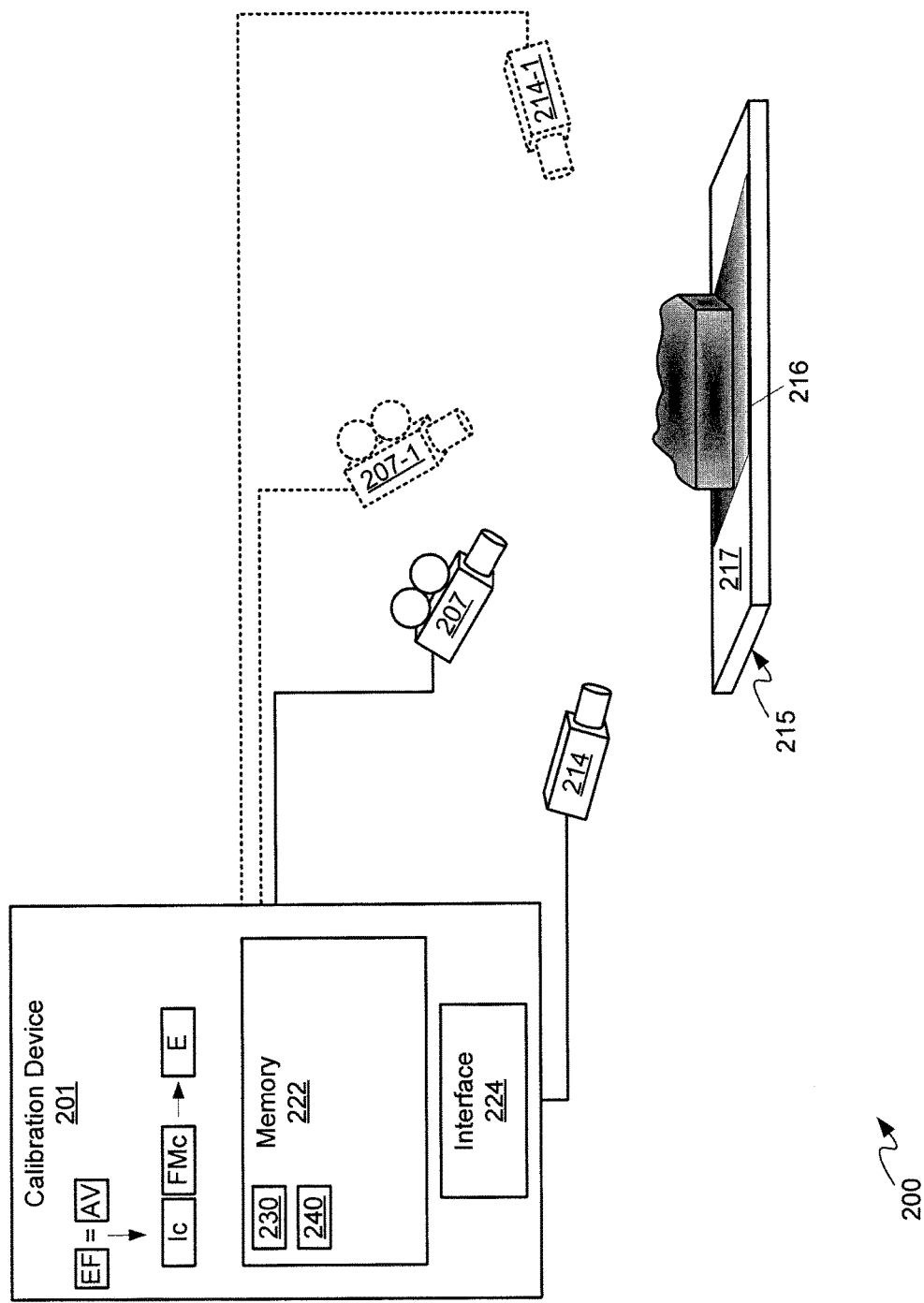
FIG. 9 depicts the calibration device of the system of FIG. 2 determining estimates of the intrinsic and extrinsic properties of the projector and the camera once the error function reaches an acceptance value, according to non-limiting implementations.

Attention is next directed to FIG. 9, which depicts the error function EF reaching the acceptance value (e.g. at block 313), and hence device 201 (e.g. at block 315) determines respective intrinsic properties and respective extrinsic properties of the projector and the camera from current values of iterative estimates, Ic, FMc. Furthermore, extrinsic properties E, of projector 207 and camera 214 can be determined from a current value Ic of the intrinsic properties and a current value FMc of the fundamental matrix. For example, the extrinsic properties E can derived at least from current value FMc of the fundamental matrix by:

$$E = Kp * FMc * Kc \quad \text{Equation (4)}$$

where Kp comprises an intrinsic calibration matrix of projector image 440 and, Kc comprises an intrinsic calibration matrix of camera image 450. For example, such extrinsic properties E can comprise a rotation and translation of camera image 450 relative to projector image 440, or vice versa, which in turn relates rotation and translation of camera 214 relative to projector 207, or vice versa. In general functions for determining Kp and Kc are known to persons skilled in the art and can be determined from the respective intrinsic properties of each of projector 207 and camera 214.

As discussed above, when convergence of the error function EF does not occur and/or when the error function EF does not reach the acceptance value AV and/or when the error function EF does not converge and/or reach the acceptance value AV within a given time period, method 300 can terminate and be repeated using a different projector image being projected by projector 207, for example another image in a stream of images being projected by projector 207. Indeed, selection of which projector image to be used in method 300 can be arbitrary, with device 201 implementing method 300 using projector images and camera images at a given sampling rate.

In any event, the current intrinsic properties and extrinsic properties of projector 207 and camera 214 can then be provided to a device that is, in turn, warping images projected by projector 207, for example a pose data 109p (transmitted to device 101 and/or warping module 113) though in some implementations such a device comprises device 201. Either way, projection of images by projector 207 can be updated and/or warped to take into account the estimated intrinsic properties and estimated extrinsic properties determined using method 300.

Furthermore, when system 200 comprises more than one projector and/or more than one camera, method 300 can be implemented to estimate intrinsic properties and extrinsic properties for various pairs of projectors and cameras and such estimated intrinsic properties and extrinsic properties can also be used to update and/or warp images being projected by the projectors. However, such independent processing of pairs of projectors and cameras can be inefficient and hence techniques such as Bundle adjustment can be used to expand the iterative determination of the error function (e.g. at block 311) for systems that comprise more than one projector and/or more than one camera.

In addition, method 300 can be repeated even when the error function EF converges and/or reaches the acceptance value AV, for example using a lower acceptance value, to further refine estimated intrinsic and extrinsic properties. For example, in these implementations, method 300 can be implemented using an initial acceptance value to quickly obtain estimated intrinsic and extrinsic properties of projector 207 and camera 214 in order to quickly provide projection mapping of projected images onto environment 215, and then method 300 can be repeated using an acceptance value smaller than the initial acceptance value to better refine the estimated intrinsic and extrinsic properties of projector 207 and camera 214. From a viewer's perspective, images projected onto environment 215 can initially appear to be imperfectly mapped and the mapping can be viewed to improve as time passes.

Hence, provided herein is a system and method for online projector-camera calibration from one or more images that solves for sparse correspondences between a projector image and a camera image, and then estimates for calibration parameters including intrinsic, extrinsic, and distortion parameters using the sparse correspondences. For example, the online projector-camera calibration described herein comprises an auto-calibration technique that uses natural content projection to encode correspondences between projected images and camera images. These correspondences are embedded in an optimization criterion that takes into account different closed-form solutions for focal lengths. The auto-calibration technique can be implemented using two processes. A) Sparse correspondences are solved between projector and camera using natural content projections on an arbitrary three-dimensional (and/or two-dimensional) environment. A matching method uses uniquely distinguishable feature representations that are detected in the projected image and matched to a camera image with guidance of image disparity between projector and camera. This can maintain uniquely distinguishable features, eliminate non-distinguishable features and generally serves to eliminate most outliers and hence can be referred to as a sparse correspondence map, as not all pixels are mapped as occurs when structured-light patterns are used for calibration. B) The sparse correspondence map is used to determine the intrinsic and extrinsic parameters of projector and camera. All the parameters are embedded in one objective closed-form function using a data term to constraint matching correspondences by epipolar geometry, a regularization term for principal points, and regularization terms for the focal lengths that take into account different closed form solutions which ensure fast and accurate convergence to the right solution.

Those skilled in the art will appreciate that in some implementations, the functionality of devices 101, 108, 201, content player 103, and alignment system 105 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 108, 201, content player 103, and alignment system 105 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a calibration device; a projector; and a camera, a field of view of the camera at least partially overlapping a projection area of the projector; the calibration device configured to:
control the projector to project a projector image;
receive a camera image from the camera, the camera image comprising the projector image as captured by the camera;
determine a correspondence map between respective pixels of each of the projector image and the camera image in fewer than one hundred percent of pixels of the projector image by: using feature extraction to match features in the projector image and the camera image in the fewer than one hundred percent of the pixels in areas of the projector image; and, discarding the features that are indistinguishable from each other such that pixels in areas of the projector image associated with indistinguishable features are not mapped;
determine an initial estimate of a fundamental matrix from the correspondence map, the fundamental matrix mapping each projector pixel to a line in the camera image;
determine an initial estimate of intrinsic properties of the projector and the camera by using one or more closed-form solutions, the one or more closed form solutions comprising one or more of a function F1(fp, fc, pp, pc, FM)=0 and a function F2(fp, fc, FM)=0 where: fp comprises an estimated focal length of the projector, fc comprises an estimated focal length of the camera, pp comprises an estimated principal point of the projector, pc comprises an estimated principal point of the camera, and FM is the initial estimate of the fundamental matrix;
iteratively determine an error-function based on the correspondence map using the fundamental matrix while adding constraints on the respective intrinsic properties by: using the one or more closed-form solutions; and using the initial estimate of the fundamental matrix and the initial estimate of intrinsic properties of the projector and the camera as initial input to one or more of the function F1 and the function F2; and,
when the error-function reaches an acceptance value, determine respective intrinsic properties and respective extrinsic properties of the projector and the camera from current values of iterative estimates by: first determining the respective intrinsic properties; and then determining the respective extrinsic properties from the respective intrinsic properties and current values of the fundamental matrix obtained in the iterative processing of the error-function.

2. The system of claim 1, wherein the calibration device is further configured to iteratively determine the error-function using the one or more closed-form solutions and by correcting distortions of respective lenses of the projector and the camera.

3. The system of claim 1, wherein the projector image comprises one or more of: a natural image; a non-structured light image; a cinema image; an image that includes representations of one or more of: man-made structures, man-made devices, natural structures; artificially generated content; combined natural-artificial content; augmented reality content; and structured-light-like markers comprising at least one of visible, invisible and infrared markers, added to customer content.

4. The system of claim 1, wherein the calibration device is further configured to determine the correspondence map using one or more of spatial features, temporal features, and spatio-temporal features.

5. The system of claim 1, wherein the calibration device is further configured to determine the correspondence map using one or more of: screen isolation, colour correction, optical flow estimation, and patch-based pixel correlation.

6. The system of claim 1, wherein the features matched in the feature extraction comprise one or more of: edges, patterns, areas that include colour changes, and areas that are unique within the projector image.

7. The system of claim 1, wherein the feature extraction comprises one or more of edge-guided extraction and non-edge guided extraction.

8. The system of claim 1, wherein the correspondence map between the respective pixels of each of the projector image and the camera image occurs for up to about 80% of the respective pixels.

9. The system of claim 1, wherein the error-function comprises one or more of: a Sampson reprojection error; one or more constraints on respective focal lengths of one or more of the projector and the camera; and one or more constraints on respective principal points of one or more of the projector and the camera.

10. The system of claim 1, wherein iteratively determining the error-function comprises one or more of: iteratively solving the error-function; iteratively solving the error-function using a Levenberg-Marquardt algorithm; and solving for respective lens distortion of the projector and the camera.

11. A method comprising:
at a system comprising: a calibration device; a projector; and a camera, a field of view of the camera at least partially overlapping a projection area of the projector, controlling, using the calibration device, the projector to project a projector image;

receiving at the calibration device, a camera image from the camera, the camera image comprising the projector image as captured by the camera;

determining, at the calibration device, a correspondence map between respective pixels of each of the projector image and the camera image in fewer than one hundred percent of pixels of the projector image by: using feature extraction to match features in the projector image and the camera image in the fewer than one hundred percent of the pixels in areas of the projector image; and, discarding the features that are indistinguishable from each other such that pixels in areas of the projector image associated with indistinguishable features are not mapped;

determining, at the calibration device, an initial estimate of a fundamental matrix from the correspondence map, the fundamental matrix mapping each projector pixel to a line in the camera image;

determining, at the calibration device, an initial estimate of intrinsic properties of the projector and the camera by using one or more closed-form solutions, the one or more closed form solutions comprising one or more of a function F1(fp, fc, pp, pc, FM)=0 and a function F2(fp, fc, FM)=0 where: fp comprises an estimated focal length of the projector, fc comprises an estimated focal length of the camera, pp comprises an estimated principal point of the projector, pc comprises an estimated principal point of the camera, and FM is the initial estimate of the fundamental matrix;

iteratively determining, at the calibration device, an error-function based on the correspondence map using the fundamental matrix while adding constraints on the respective intrinsic properties by: using the one or more closed-form solutions; and using the initial estimate of the fundamental matrix and the initial estimate of intrinsic properties of the projector and the camera as initial input to one or more of the function F1 and the function F2; and, when the error-function reaches an acceptance value, determine respective intrinsic properties and respective extrinsic properties of the projector and the camera from current values of iterative estimates by: first determining the respective intrinsic properties; and then determining the respective extrinsic properties from the respective intrinsic properties and current values of the fundamental matrix obtained in the iterative processing of the error-function.

12. The method of claim 11, further comprising iteratively determining, at the calibration device, the error-function using the one or more closed-form solutions and by correcting distortions of respective lenses of the projector and the camera.

13. The method of claim 11, wherein the projector image comprises one or more of: a natural image; a non-structured light image; a cinema image; an image that includes representations of one or more of: man-made structures, man-made devices, natural structures; artificially generated content; combined natural-artificial content; augmented reality content; and structured-light-like markers comprising at least one of visible, invisible and infrared markers, added to customer content.

14. The method of claim 11, further comprising determining, at the calibration device, the correspondence map using one or more of spatial features, temporal features, and spatio-temporal features.

15. The method of claim 11, further comprising determining, at the calibration device, the correspondence map using one or more of: screen isolation, colour correction, optical flow estimation, and patch-based pixel correlation.

16. The method of claim 11, wherein the features matched in the feature extraction comprise one or more of: edges, patterns, areas that include colour changes, and areas that are unique within the projector image.

17. The method of claim 11, wherein the feature extraction comprises one or more of edge-guided extraction and non-edge guided extraction.

18. A non-transitory computer-readable medium storing a computer program, wherein execution of the computer program is for:

at a system comprising: a calibration device; a projector; and a camera, a field of view of the camera at least partially overlapping a projection area of the projector, controlling, using the calibration device, the projector to project a projector image;

receiving at the calibration device, a camera image from the camera, the camera image comprising the projector image as captured by the camera;

determining, at the calibration device, a correspondence map between respective pixels of each of the projector image and the camera image in fewer than one hundred percent of pixels of the projector image by: using feature extraction to match features in the projector image and the camera image in the fewer than one hundred percent of the pixels in areas of the projector image; and, discarding the features that are indistinguishable from each other such that pixels in areas of the projector image associated with indistinguishable features are not mapped;

determining, at the calibration device, an initial estimate of intrinsic properties of the projector and the camera by using one or more closed-form solution, the one or more closed form solutions comprising one or more of a function F1(fp, fc, pp, pc, FM)=0 and a function F2(fp, fc, FM)=0 where: fp comprises an estimated focal length of the projector, fc comprises an estimated focal length of the camera, pp comprises an estimated principal point of the projector, pc comprises an estimated principal point of the camera, and FM is the initial estimate of the fundamental matrix; iteratively determining, at the calibration device, an error-function based on the correspondence map using the fundamental matrix while adding constraints on the respective intrinsic properties by: using the one or more closed-form solutions; and using the initial estimate of the fundamental matrix and the initial estimate of intrinsic properties of the projector and the camera as initial input to one or more of the function F1 and the function F2; and, when the error-function reaches an acceptance value, determine respective intrinsic properties and respective extrinsic properties of the projector and the camera from current values of iterative estimates by: first determining the respective intrinsic properties; and then determining the respective extrinsic properties from the respective intrinsic properties and current values of the fundamental matrix obtained in the iterative processing of the error-function.

* * * * *